United States Patent
Zhang et al.

(10) Patent No.: US 11,770,154 B2
(45) Date of Patent: Sep. 26, 2023

(54) DEVICE AND SYSTEM FOR PREVENTING DROWNING

(71) Applicants: HONGFUJIN PRECISION ELECTRONICS (ZHENGZHOU) CO., LTD., Zhengzhou (CN); HON HAI PRECISION INDUSTRY CO., LTD., New Taipei (TW)

(72) Inventors: Teng-Fei Zhang, Zhengzhou (CN); Hai-Tao Xu, Zhengzhou (CN); Hui-Sheng Liu, Zhengzhou (CN)

(73) Assignees: HONGFUJIN PRECISION ELECTRONICS (ZHENGZHOU) CO., LTD., Zhengzhou (CN); HON HAI PRECISION INDUSTRY CO., LTD., New Taipei (TW)

( * ) Notice: Subject to any disclaimer, the term of this patent is extended or adjusted under 35 U.S.C. 154(b) by 34 days.

(21) Appl. No.: 17/554,509

(22) Filed: Dec. 17, 2021

(65) Prior Publication Data
US 2022/0321168 A1 Oct. 6, 2022

(30) Foreign Application Priority Data
Apr. 1, 2021 (CN) .......................... 202120670784.4

(51) Int. Cl.
*H04B 1/7163* (2011.01)
*H04W 4/029* (2018.01)
*G08B 21/08* (2006.01)

(52) U.S. Cl.
CPC ......... *H04B 1/71632* (2013.01); *G08B 21/08* (2013.01); *G08B 21/088* (2013.01); *H04W 4/029* (2018.02)

(58) Field of Classification Search
CPC .. G08B 21/08; G08B 21/088; H04B 1/71632; H04B 2201/71634; H04W 4/029; H04W 4/80
See application file for complete search history.

(56) References Cited

U.S. PATENT DOCUMENTS

| | | | | |
|---|---|---|---|---|
| 5,144,285 A | * | 9/1992 | Gore | G08B 21/082 340/541 |
| 10,587,348 B2 | * | 3/2020 | Goren | H01Q 1/04 |
| 2008/0218332 A1 | * | 9/2008 | Lyons | G08B 25/001 340/529 |
| 2020/0020221 A1 | * | 1/2020 | Cutler | H04W 4/70 |
| 2022/0291393 A1 | * | 9/2022 | Gum | G01S 19/48 |

* cited by examiner

*Primary Examiner* — John A Tweel, Jr.
(74) *Attorney, Agent, or Firm* — ScienBiziP, P.C.

(57) ABSTRACT

A system for increased safety levels at swimming venues includes an Ultra Wide Band (UWB) tag, a control terminal, and at least three base stations. The UWB tag transmits positioning data of the tag worn by a swimmer and transmits a signal to the at least three base stations. The base stations receive the signal and the positioning data, record time when receiving same, and send the signal, the positioning data, and the time to the control terminal. The control terminal calculates position of the swimmer's UWB tag according to the positioning data and the time when a period of attenuation or disappearance of the wireless connection signal from the immersed UWB tag exceeds a first preset time, generates alarm information, and sends the position of the UWB tag and the alarm information to notify a security officer.

15 Claims, 4 Drawing Sheets

DEVICE AND SYSTEM FOR PREVENTING DROWNING

CROSS-REFERENCE TO RELATED APPLICATIONS

This application claims priority to Chinese Patent Application No. 202120670784.4 filed on Apr. 1, 2021, in China Intellectual Property Administration, the contents of which are incorporated by reference herein.

FIELD

The present disclosure relates to a technical field of swimming safety, and especially relates to a device and a system for preventing drowning.

BACKGROUND

As an all-round fitness sport, swimming is becoming very popular. With more people participating in swimming, there were many instances of drowning in swimming pools in recent years. Such instances not only bring heavy grief to the victims' families, but also bring huge business risks to business owners. How to ensure safety of swimmers and how to strengthen safety of swimming pools have become a common social hot topic. Existing swimming venues adopt methods of lifeguard on-site observation, sonar detection, and underwater video monitoring. However, when using lifeguards' on-site observation, the lifeguard judges whether someone is drowning by human observations, which may be limited to the lifeguard's personal physiological conditions. For example, the lifeguards working for a long time may become fatigued and lose concentration. Moreover, on-site observation by the lifeguards may be restricted by the quality of monitoring personnel and the number of people in the swimming pool, making accuracy of monitoring uncontrollable and rescue efficiency low. When using sonar detection by a sonar device, the sonar device has high costs in installation and in operation, and the sonar device cannot detect a drowning person when the drowning person's lungs are full of water, so reliability of the sonar device is poor. When underwater video monitoring is used, a time for issuing an alarm is long, and most of the alarm occurs in the late stage of drowning, so monitoring safety is insufficient

BRIEF DESCRIPTION OF THE DRAWINGS

Implementations of the present disclosure will now be described, by way of embodiments, with reference to the attached figures.

DETAILED DESCRIPTION

Figure 1:
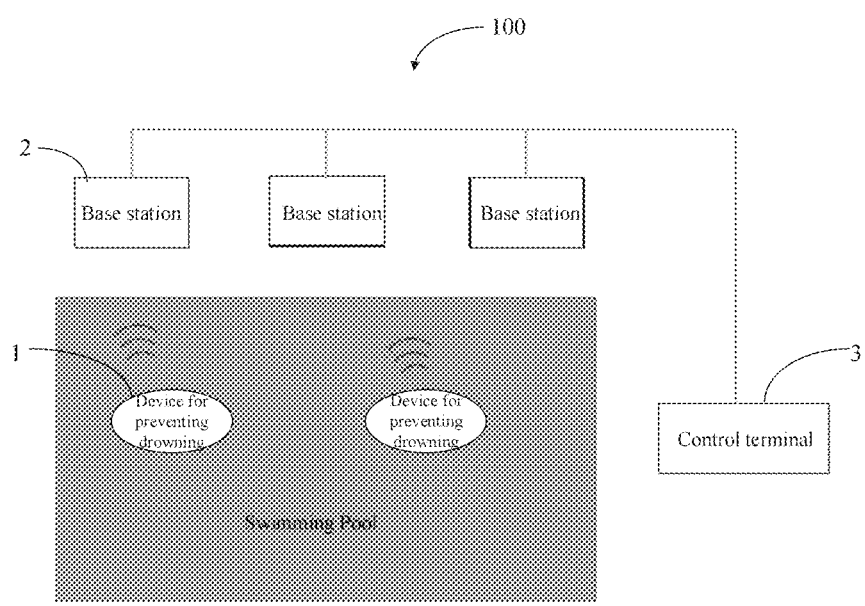
FIG. 1 is a schematic diagram of one embodiment of a system for preventing drowning in swimming venues according to the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

It should be noted that when an element is called "electrically connecting" another element, it can be directly connected to another element or connected to another element centered element by a third element. When an element is considered to be "electrically connected" to another element, it can be a contact connection, for example, a wire connection, or a non-contact connection, for example, a non-contact coupling.

The present disclosure, including the accompanying drawings, is illustrated by way of examples and not by way of limitation. Several definitions that apply throughout this disclosure will now be presented. It should be noted that references to "an" or "one" embodiment in this disclosure are not necessarily to the same embodiment, and such references mean "at least one".

The term "module", as used herein, refers to logic embodied in hardware or firmware, or to a collection of software instructions, written in a programming language, such as Java, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY, flash memory, and hard disk drives. The term "comprising" means "including, but not necessarily limited to"; it specifically indicates open-ended inclusion or membership in a so-described combination, group, series, and the like.

Exemplary embodiments of the present disclosure will be described in relation to the accompanying drawings.

FIG. 1 illustrates a system 100 for preventing drowning. The system 100 for preventing drowning includes a device 1 for preventing drowning, at least three base stations 2, and a control terminal 3. The device 1 for preventing drowning communicates with each of the three base stations 2, and each of the three base stations 2 communicates with the control terminal 3. In one embodiment, the device 1 for preventing drowning communicates with each of the three base stations 2 by BLUETOOTH communication method and/or Ultra Wide Band (UWB) communication method. Each base station 2 communicates with other base stations 2 by wired communication mode. In one embodiment, the device 1 for preventing drowning is installed on a swimming cap worn by a user in a swimming pool. In at least one embodiment, the at least three base stations 2 are installed around the swimming pool. In one embodiment, each base station 2 is connected with the control terminal 3 by wires. In one embodiment, the wired communication mode includes a network cable connection mode, a coaxial cable connection mode, a twisted pair connection mode or an optical fiber connection mode. In one embodiment, any two base stations 2, and each base station 2 and the control terminal 3 are connected by the network cable connection mode, the coaxial cable connection mode, the twisted pair connection mode, or the optical fiber connection mode.

In one embodiment, the device 1 for preventing drowning sends a connection signal and positioning data to each of the three base stations 2. Each of the three base stations 2 transmits the connection signal and the positioning data to the control terminal 3. The control terminal 3 determines whether a user carrying the device 1 is drowning according to the connection signal, determines the user's position, and generates alarm information according to the positioning data when determining that the user who is wearing the device 1 is drowning, and sends the user's position and the alarm to a preset terminal. In one embodiment, the preset terminal can be a mobile phone, a computer, or a wearable device.

Figure 2:
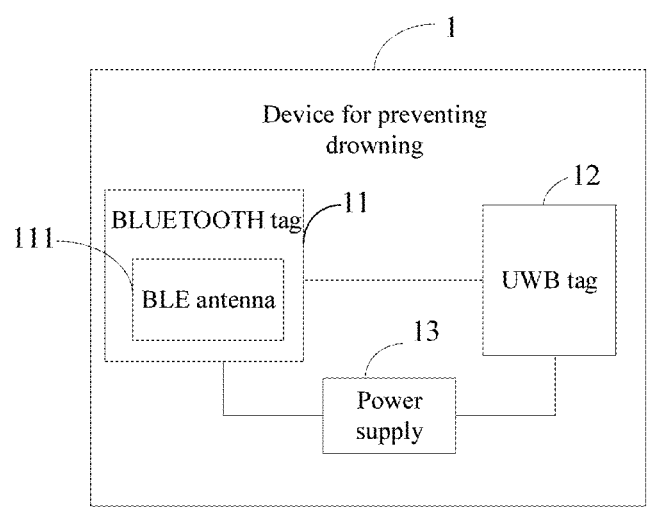
FIG. 2 is a schematic diagram of one embodiment of a device for preventing drowning according to the present disclosure.

FIG. 2 illustrates the device 1 for preventing drowning. The device 1 includes a BLUETOOTH tag 11, an UWB tag 12 and a power supply 13. In one embodiment, the power supply 13 is connected to the BLUETOOTH tag 11 and the UWB tag 12. In one embodiment, the BLUETOOTH tag 11 transmits a BLUETOOTH connection signal as the wireless connection signal transmitted by the device 1. In one embodiment, when the BLUETOOTH tag 11 is under water, or under water for a time which is longer than a certain period, radiation performance of the BLUETOOTH tag 11 is reduced, and the BLUETOOTH connection signal transmitted by the BLUETOOTH tag 11 is attenuated or disappears. In one embodiment, the BLUETOOTH tag 11 includes a BLUETOOTH low energy (BLE) antenna 111. When the BLE antenna 111 of the BLUETOOTH tag 11 is submerged in water (the relative dielectric constant of 25° C. water is 78.36 F/m), the BLUETOOTH connection signal transmitted by the BLE antenna 111 is attenuated or disappears.

In one embodiment, the UWB tag 12 transmits the positioning data of the device 1 for preventing drowning. The power supply 13 supplies power to the BLUETOOTH tag 11 and the UWB tag 12. In one embodiment, the power supply 13 can be a lithium-ion battery, and the power supply 13 can be charged by wired charging or wireless charging.

Figure 3:
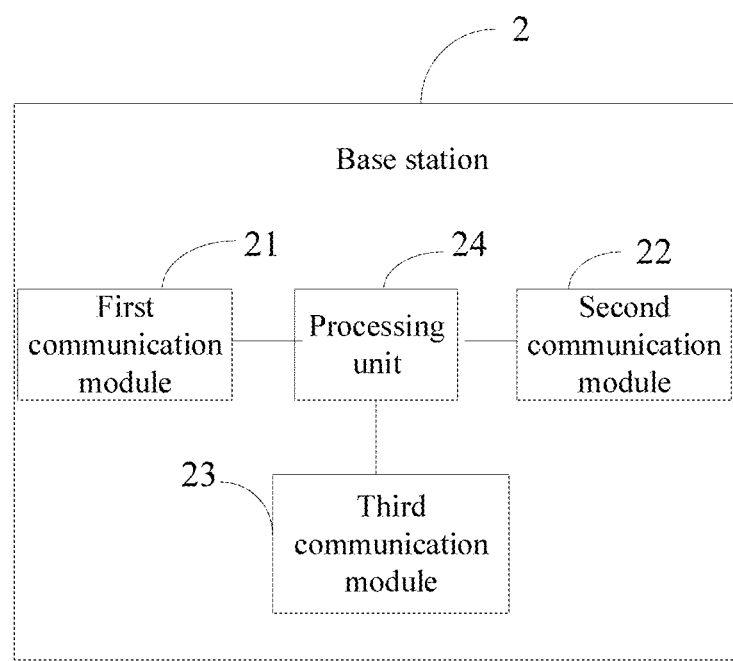
FIG. 3 is a schematic diagram of one embodiment of function of base station in the system of FIG. 1 according to the present disclosure.

In one embodiment, the base station 2 receives the BLUETOOTH connection signal sent by the BLUETOOTH tag 11 and the positioning data sent by the UWB tag 12, records the time when the base station 2 receives the positioning data, and sends the received BLUETOOTH connection signal, the positioning data, and the time to the control terminal 3. Referring to FIG. 3, in one embodiment, the base station 2 includes a first communication module 21, a second communication module 22, a third communication module 23 and a processing unit 24. In one embodiment, the first communication module 21 of the base station 2 receives the BLUETOOTH connection signal sent by the BLUETOOTH tag 11. The second communication module 22 of the base station 2 receives the positioning data transmitted by the UWB tag 12. The processing unit 24 obtains the BLUETOOTH connection signal and the positioning data, records the time when the positioning data is received, and controls the third communication module 23 to send the BLUETOOTH connection signal, the positioning data, and the time to the control terminal 3. In one embodiment, the first communication module 21 is a BLUETOOTH communication module, and the second communication module 22 is an UWB communication module. The third communication module 23 is a wired communication module, such as a network cable, a coaxial cable, a twisted pair, or an optical fiber. In one embodiment, the processing unit 24 may be a Central Processing Unit (CPU), other general-purpose processor, a Digital Signal Processors (DSP), an Application Specific Integrated Circuit (ASIC), and a Field Programmable Gate Arrays (FPGA) or other programmable logic devices, discrete gate or transistor logic devices, discrete hardware components, etc. In one embodiment, the processing unit 24 may be any conventional processor, and the processing unit 24 may also be the control center of the base station 2, connecting various parts of the whole base station 2 using various interfaces and lines.

In one embodiment, the control terminal 3 receives the BLUETOOTH connection signal, the positioning data and the time sent by the base station 2, and determines whether a user carrying the device 1 is submerged according to the BLUETOOTH connection signal. In one embodiment, the control terminal 3 determines whether a duration time of attenuation or disappearance of the received BLUETOOTH connection signal exceeds a first preset time, and determines that a user carrying the device 1 is drowning when the duration of attenuation or disappearance of the received BLUETOOTH connection signal exceeds the first preset time. In one embodiment, when the duration time of attenuation or disappearance of the BLUETOOTH connection signal exceeds the first preset time, the control terminal 3 calculates position of the device 1 by using a Time Difference Of Arrival (TDOA) algorithm according to the positioning data and the time, generates alarm information, and sends the position of the device 1 and the alarm information to the preset terminal to notify a security officer, so that the security officer can rescue the drowning user in time. In one embodiment, the alarm information can be at least one of text information, sound information and image information. In one embodiment, the control terminal 3 receives the BLUETOOTH connection signal, the positioning data and the time sent by the base station 2 every second preset time. In one embodiment, the first preset time and the second preset time can be set according to the user's needs. For example, the first preset time can be set to 15 seconds and the second preset time can be set to 1 second.

In one embodiment, the control terminal 3 uses following formulas:

$$\sqrt{(x_1-x)^2+(y_1-y)^2+((z_1-z)^2)} - \sqrt{(x_2-x)^2+(y_2-y)^2+((z_2-z)^2)} = c \cdot (t_1-t_2)$$

$$\sqrt{(x_2-x)^2+(y_2-y)^2+((z_2-z)^2)} - \sqrt{(x_3-x)^2+(y_3-y)^2+((z_3-z)^2)} = c \cdot (t_2-t_3)$$

$$\sqrt{(x_1-x)^2+(y_1-y)^2+((z_1-z)^2)} - \sqrt{(x_3=x)^2+(y_3-y)^2+((z_3-z)^2)} = c \cdot (t_1-t_3)$$

to calculate the position of the device 1 for preventing drowning according to the positioning data and the time. In one embodiment, (x, y, z) are position coordinates of the device 1, (x1, y1, z1), (x2, y2, z2), and (x3, y3, z3) are position coordinates of the three base stations 2, t1, t2 and t3 are the time recorded by the three base stations 2 respectively, and c is the propagation speed of ultra band width signal carrying the positioning data transmitted by the device 1. In this embodiment, the position coordinates (x1, y1, z1), (x2, y2, z2), (x3, y3, z3) of the three base stations 2 and the propagation speed c of the ultra bandwidth signal are known values which are stored in the control terminal 3.

In one embodiment, the control terminal 3 displays the position of the device 1 for the user to view. For example, the control terminal 3 displays the position of the device 1 on a display screen or an application interface. In one embodiment, the control terminal 3 may be at least one of a mobile phone, a notebook computer, a computer, a tablet computer, a desktop computer, and a server.

Figure 4:
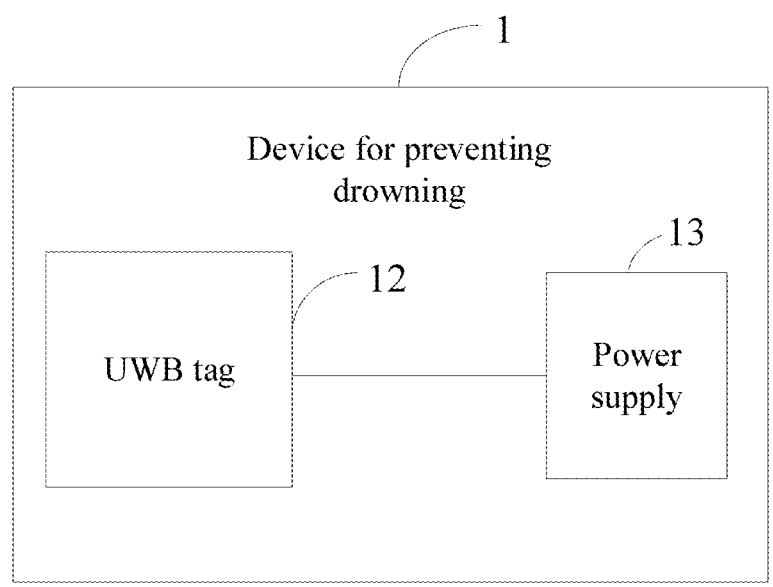
FIG. 4 is a schematic diagram of another embodiment of a device for preventing drowning according to the present disclosure.

FIG. 4 illustrates another embodiment of the device 1 for preventing drowning. The device 1 includes an UWB tag 12 and a power supply 13. The power supply 13 is connected to the UWB tag 12 for supplying power to the UWB tag 12. In one embodiment, the UWB tag 12 transmits an ultra bandwidth connection signal including the positioning data of the device 1 as a wireless connection signal. In one embodiment, when the UWB tag 12 is immersed in water, the radiation performance of the UWB tag 12 is reduced, and the ultra bandwidth connection signal transmitted by the UWB tag 12 is attenuated or disappears.

In one embodiment, the base station 2 receives the ultra bandwidth connection signal sent by the UWB tag 12, records the time when receiving the ultra bandwidth connection signal, obtains the positioning data from the ultra bandwidth connection signal, and sends the ultra bandwidth connection signal, the time and the positioning data to the control terminal 3. In one embodiment, the second communication module 22 of the base station 2 receives the ultra bandwidth connection signal sent by the UWB tag 12 and obtains the positioning data from the ultra bandwidth connection signal. The processing unit 24 obtains the ultra bandwidth connection signal and the positioning data received by the second communication module 22, records the time of receiving the ultra bandwidth connection signal, and controls the third communication module 23 to send the ultra bandwidth connection signal, the positioning data, and the time to the control terminal 3. In one embodiment, the base station 2 includes a second communication module 22, a third communication module 23, and a processing unit 24, but does not include a first communication module 21.

In one embodiment, the control terminal 3 receives the ultra bandwidth connection signal, the positioning data, and the time sent by the base station 2, and determines whether the user carrying the device 1 is drowning according to the ultra bandwidth connection signal. In one embodiment, the control terminal 3 determines whether the duration time of attenuation or disappearance of the ultra bandwidth connection signal exceeds the first preset time, and determines that user is drowning when the duration time of attenuation or disappearance of the ultra bandwidth connection signal exceeds the first preset time.

In one embodiment, the control terminal 3 calculates the position of the device 1 by using the TDOA algorithm according to the positioning data and the time, generates the alarm information, and sends the position and the alarm information to the safety officer when the duration of attenuation or disappearance of the ultra bandwidth connection signal exceeds the first preset time, so that the safety officer can rescue the drowning user in time. In one embodiment, the method of calculating the position of the device 1 by using TDOA algorithm according to the positioning data and the time can refer to the embodiments described above.

In one embodiment, the control terminal 3 receives the ultra bandwidth connection signal and the time transmitted by the base station 2 every second preset interval. In one embodiment, the first preset time or period and the second preset time or period can be set according to user's needs. For example, the first preset time can be set to 15 seconds and the second preset time can be set to 1 second.

The exemplary embodiments shown and described above are only examples. Even though numerous characteristics and advantages of the present disclosure have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims.

What is claimed is:

1. A device for preventing drowning comprising:
an Ultra Wide Band (UWB) tag; and
a power supply connected to the UWB tag, wherein the power supply supplies power to the UWB tag, the UWB tag transmits positioning data of the device and an ultra wide bandwidth connection signal as a wireless connection signal to at least three base stations, and each of the at least three base stations records time when the positioning data sent by the UWB tag is received by the device, the wireless connection signal transmitted by the UWB tag is attenuated or disappears when the device is immersed in water.

2. The device for preventing drowning according to claim 1, further comprises a BLUETOOTH tag connected to the power supply, wherein the BLUETOOTH tag transmits a BLUETOOTH connection signal as a second wireless connection signal, and the BLUETOOTH connection signal transmitted by the BLUETOOTH tag is attenuated or disappears when the device is immersed in water.

3. The device for preventing drowning according to claim 2, wherein the BLUETOOTH tag comprises a BLUETOOTH low energy (BLE) antenna, the BLE antenna transmits the BLUETOOTH connection signal.

4. The device for preventing drowning according to claim 1, wherein the power supply is a lithium-ion battery.

5. The device for preventing drowning according to claim 1, wherein the ultra wide bandwidth connection signal comprises the positioning data of the device.

6. A system for preventing drowning comprising:
a device comprising:
an Ultra Wide Band (UWB) tag; and
a power supply connected to the UWB tag, wherein the power supply supplies power to the UWB tag, the UWB tag transmits positioning data of the device and an ultra wide bandwidth connection signal as a wireless connection signal, the wireless connection signal transmitted by the UWB tag is attenuated or disappears when the device is immersed in water;
a control terminal; and
at least three base stations, wherein the at least three base stations receive the wireless connection signal and the positioning data, record time when each of the at least three base stations receives the positioning data, and send the wireless connection signal, the positioning data, and the time to the control terminal;
wherein the control terminal receives the wireless connection signal, the positioning data, and the time, and determines whether a duration time of attenuation or disappearance of the wireless connection signal exceeds a first preset time, and calculates position of the device according to the positioning data and the time when the duration time of attenuation or disappearance of the wireless connection signal exceeds the first preset time, generates alarm information, and sends the position of the device and the alarm information to a preset terminal;
the control terminal applies formulas as follows:

$$\sqrt{(x_1-x)^2+(y_1-y)^2+((z_1-z)^2)} - \sqrt{(x_2-x)^2+(y_2-y)^2+((z_2-z)^2)} = c \cdot (t_1-t_2);$$

$$\sqrt{(x_2-x)^2+(y_2-y)^2+((z_2-z)^2)}-\sqrt{(x_3-x)^2+(y_3-y)^2+((z_3-z)^2)}=c\cdot(t_2-t_3);$$

$$\sqrt{(x_1-x)^2+(y_1-y)^2+((z_1-z)^2)}-\sqrt{(x_3=x)^2+(y_3-y)^2+((z_3-z)^2)}=c\cdot(t_1-t_3)$$

to calculate the position of the device according to the positioning data and the time, wherein (x, y, z) are position coordinates of the device, (x1, y1, z1), (x2, y2, z2), and (x3, y3, z3) are position coordinates of the at least three base stations, (t1, t2, t3) are the time recorded by the at least three base stations, and c is a propagation speed of the wireless connection signal comprising the positioning data transmitted by the device.

7. The system for preventing drowning according to claim 6, wherein each of the at least three base stations comprises a first communication module, a second communication module, a third communication module and a processing unit, the first communication module receives the wireless connection signal, the second communication module receives the positioning data from the UWB tag or receives the positioning data from the wireless connection signal, the processing unit obtains the wireless connection signal and the positioning data, records the time when the positioning data is received, and controls the third communication module to send the wireless connection signal, the positioning data, and the time to the control terminal.

8. The system for preventing drowning according to claim 7, wherein the first communication module is a BLUETOOTH communication module, and the second communication module is an UWB communication module, and the third communication module is a wired communication module.

9. The system for preventing drowning according to claim 8, wherein the wired communication module is a network cable, a coaxial cable, a twisted pair, or an optical fiber.

10. The system for preventing drowning according to claim 6, wherein the control terminal displays the position of the device.

11. The system for preventing drowning according to claim 6, wherein the control terminal receives the wireless connection signal and the time transmitted by each of the at least three base stations every second preset time.

12. The system for preventing drowning according to claim 6, wherein the device further comprises a BLUETOOTH tag, the BLUETOOTH tag is connected to the power supply, the BLUETOOTH tag transmits a BLUETOOTH connection signal as a second wireless connection signal, the BLUETOOTH connection signal transmitted by the BLUETOOTH tag is attenuated or disappears when the device is immersed in water.

13. The system for preventing drowning according to claim 12, wherein the BLUETOOTH tag comprises a BLUETOOTH low energy (BLE) antenna, the BLE antenna transmits the BLUETOOTH connection signal.

14. The system for preventing drowning according to claim 6, wherein the power supply is a lithium-ion battery.

15. The system for preventing drowning according to claim 6, wherein the ultra wide bandwidth connection signal comprises the positioning data of the device.

* * * * *